United States Patent
Imfeld et al.

(10) Patent No.: US 10,604,610 B2
(45) Date of Patent: Mar. 31, 2020

(54) PEROXIDE-MODIFIED LINEAR LOW DENSITY POLYETHYLENE FILMS, SHEETS, AND MULTILAYER STRUCTURES

(71) Applicant: EQUISTAR CHEMICALS, LP, Houston, TX (US)

(72) Inventors: Stephen M. Imfeld, Cincinnati, OH (US); D. Ryan Breese, Loveland, OH (US)

(73) Assignee: Equistar Chemicals, LP, Houston, TX (US)

( * ) Notice: Subject to any disclaimer, the term of this patent is extended or adjusted under 35 U.S.C. 154(b) by 46 days.

(21) Appl. No.: 15/880,326

(22) Filed: Jan. 25, 2018

(65) Prior Publication Data
US 2018/0215907 A1    Aug. 2, 2018

Related U.S. Application Data

(60) Provisional application No. 62/451,652, filed on Jan. 27, 2017.

(51) Int. Cl.
| | |
|---|---|
| C08L 23/06 | (2006.01) |
| C08L 23/26 | (2006.01) |
| C08K 5/14 | (2006.01) |
| C08J 3/24 | (2006.01) |
| C08F 255/02 | (2006.01) |
| C08F 110/02 | (2006.01) |
| C08L 23/30 | (2006.01) |

(52) U.S. Cl.
CPC ........ *C08F 255/023* (2013.01); *C08F 110/02* (2013.01); *C08J 3/24* (2013.01); *C08K 5/14* (2013.01); *C08L 23/06* (2013.01); *C08L 23/26* (2013.01); *C08L 23/30* (2013.01); *C08J 2323/06* (2013.01); *C08L 2203/16* (2013.01); *C08L 2203/202* (2013.01); *C08L 2205/025* (2013.01); *C08L 2207/062* (2013.01); *C08L 2314/02* (2013.01)

(58) Field of Classification Search
None
See application file for complete search history.

(56) References Cited

U.S. PATENT DOCUMENTS

| | | | | |
|---|---|---|---|---|
| 4,460,750 A | * | 7/1984 | Thiersault | C08F 8/00 525/333.8 |
| 4,737,547 A | * | 4/1988 | White | C08L 23/04 525/184 |
| 5,728,335 A | * | 3/1998 | Neubauer | B29B 9/06 264/141 |
| 5,756,203 A | * | 5/1998 | Shirodkar | C08J 5/18 428/334 |
| 5,962,598 A | * | 10/1999 | Mack | C08J 5/18 264/211.12 |

(Continued)

*Primary Examiner* — Tae H Yoon

(57) ABSTRACT

The present disclosure provides a peroxide-modified polyethylene and related compositions as well as films, sheets, and multilayer structures made therefrom. A film composition is made from or containing a peroxide-modified polyethylene composition made from or containing a peroxide-modified polyethylene made from or containing the reaction products of a polyethylene composition made from or containing a first Ziegler-Natta-catalyzed polyethylene and a first amount of an organic peroxide to the second reactor.

7 Claims, 5 Drawing Sheets

(56) References Cited

U.S. PATENT DOCUMENTS

| | | | |
|---|---|---|---|
| 6,984,698 B2* | 1/2006 | McLeod | C08J 5/18 525/333.8 |
| 8,889,794 B2* | 11/2014 | Wang | C08J 5/18 428/523 |
| 2004/0082722 A1 | 4/2004 | McLeod et al. | |

* cited by examiner

Peroxide Curing Data

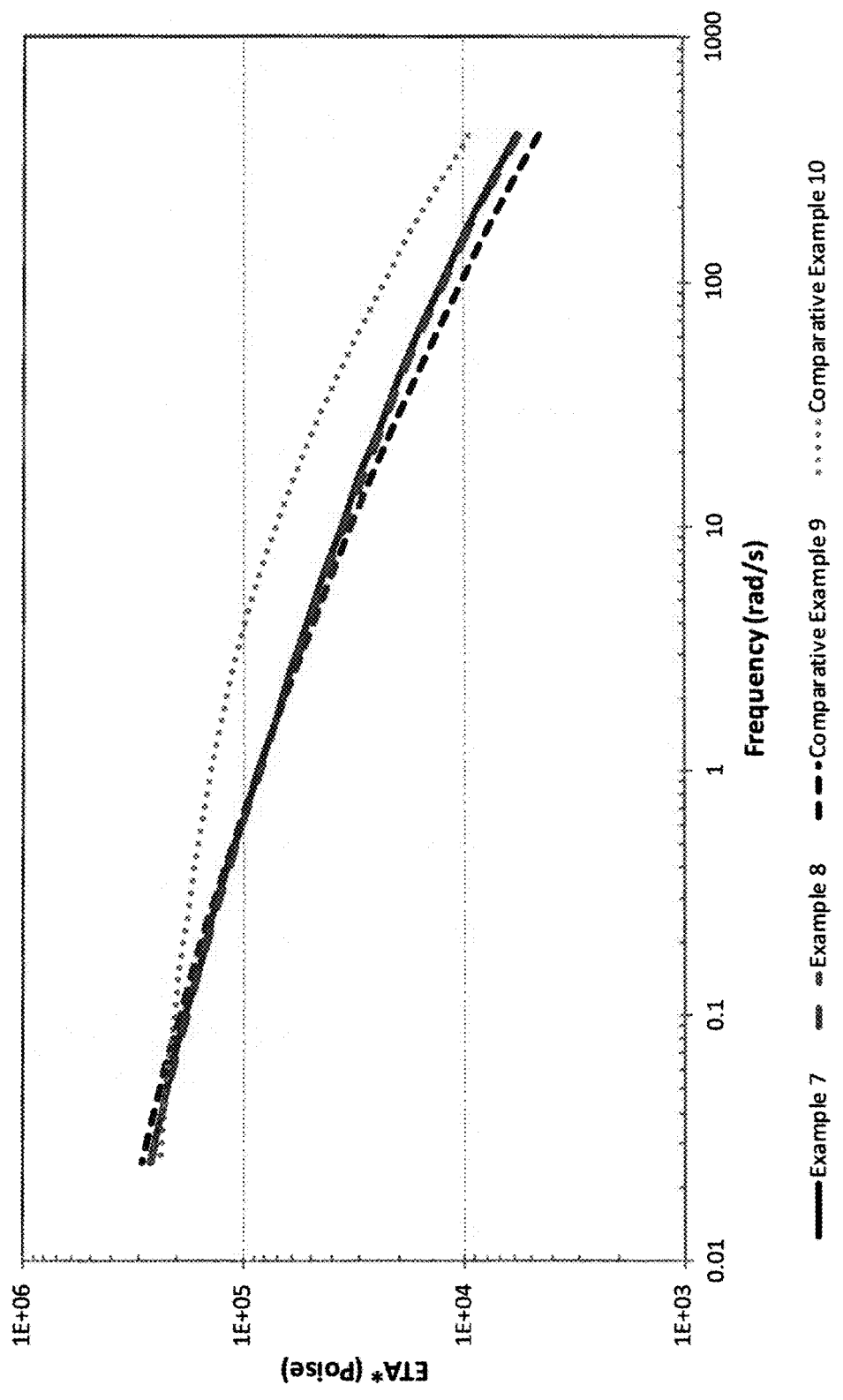

PEROXIDE-MODIFIED LINEAR LOW DENSITY POLYETHYLENE FILMS, SHEETS, AND MULTILAYER STRUCTURES

CROSS-REFERENCE TO RELATED APPLICATIONS

This application is the Non-Provisional Patent Application, which claims benefit of priority to U.S. Provisional Application No. 62/451,652, filed Jan. 27, 2017, the contents of which are incorporated herein by reference in their entirety.

FIELD OF THE INVENTION

In general, the present disclosure relates to the field of chemistry. More specifically, the present disclosure relates to polymer chemistry. In particular, the present disclosure relates to peroxide-modified polyethylene and related compositions as well as films, sheets, and multilayer structures made therefrom.

BACKGROUND OF THE INVENTION

Ziegler-Natta (Z-N) catalyst systems can be used to produce linear low density polyethylene (LLDPE), medium density polyethylene (MDPE), and high density polyethylene (HDPE) resins. However, some Z-N-catalyzed polymers with high tear and impact strength have shown limited usefulness for film and sheet applications because the polymers can have poor extrudability.

An example is superhexene linear low density polyethylenes, which have shown excellent tear and impact strength properties with poor extrudability.

Additionally, chromium-catalyzed LLDPE, MDPE, and HDPE products have demonstrated good extrudability but poor tear and impact strength properties for film applications.

It is desirable to produce Z-N catalyzed polymers that provide good tear and impact strength properties while demonstrating extrudability similar to that of chromium-catalyzed polymers.

BRIEF SUMMARY OF THE INVENTION

In a general embodiment, the present disclosure provides a process for preparing a peroxide-modified polyethylene including the steps of:
(A) preparing a first Ziegler-Natta-catalyzed polyethylene in a first reactor;
(B) transferring the first Ziegler-Natta-catalyzed polyethylene from the first reactor to a second reactor;
(C) admixing a first amount of an organic peroxide to the second reactor;
(D) reacting the organic peroxide with a polyethylene composition made from or containing the first Ziegler-Natta-catalyzed polyethylene, thereby coupling the polyethylene components and forming the peroxide-modified polyethylene; and
(E) collecting the peroxide-modified polyethylene.

In some embodiments, the present disclosure provides a process for preparing a peroxide-modified polyethylene including the steps of:
(A) preparing a first Ziegler-Natta-catalyzed polyethylene in a first reactor;
(B) preparing a high density polyethylene in a second reactor;
(C) transferring the first Ziegler-Natta-catalyzed polyethylene from the first reactor to a third reactor;
(D) transferring the high density polyethylene from the second reactor to the third reactor;
(E) admixing a first amount of an organic peroxide to the third reactor;
(F) reacting the organic peroxide with a polyethylene composition made from or containing the first Ziegler-Natta-catalyzed polyethylene and the high density polyethylene, thereby coupling the polyethylene components and forming the peroxide-modified polyethylene; and
(G) collecting the peroxide-modified polyethylene.

In some embodiments, the present disclosure provides a process for preparing a peroxide-modified polyethylene including the steps of:
(A) preparing a first Ziegler-Natta-catalyzed polyethylene in a first reactor, having a melt index (ASTM D 1238) in the range of about 5.5 g/10 min to about 7.5 g/10 min;
(B) preparing a second Ziegler-Natta-catalyzed polyethylene in a second reactor, having a melt index in the range of about 0.5 g/10 min to about 3.0 g/10 min;
(C) transferring the first Ziegler-Natta-catalyzed polyethylene from the first reactor to a third reactor;
(D) transferring the second Ziegler-Natta-catalyzed polyethylene from the second reactor to the third reactor;
(E) admixing a first amount of an organic peroxide to the third reactor;
(F) reacting the organic peroxide with a polyethylene composition made from or containing the first Ziegler-Natta-catalyzed polyethylene and the second Ziegler-Natta-catalyzed polyethylene, thereby coupling the polyethylene components and forming a peroxide-modified polyethylene; and
(E) collecting the peroxide-modified polyethylene.

In some embodiments, the present disclosure provides a process for preparing a peroxide-modified polyethylene including the steps of:
(A) preparing a first Ziegler-Natta-catalyzed polyethylene in a first reactor, having a melt index (ASTM D 1238) in the range of about 0.5 g/10 min to about 160 g/10 min;
(B) preparing a second Ziegler-Natta-catalyzed polyethylene in a second reactor, having a melt index in the range of about 0.5 g/10 min to about 7.0 g/10 min;
(C) transferring the first Ziegler-Natta-catalyzed polyethylene from the first reactor to a third reactor;
(D) transferring the second Ziegler-Natta-catalyzed polyethylene from the second reactor to the third reactor;
(E) admixing a first amount of an organic peroxide to the third reactor;
(F) reacting the organic peroxide with a polyethylene composition made from or containing the first Ziegler-Natta-catalyzed polyethylene and the second Ziegler-Natta-catalyzed polyethylene, thereby coupling the polyethylene components and forming a peroxide-modified polyethylene; and
(E) collecting the peroxide-modified polyethylene.

In a general embodiment, the present disclosure provides a peroxide-modified polyethylene composition made from or containing a peroxide-modified polyethylene.

In a general embodiment, the present disclosure provides a film composition made from or containing a peroxide-modified polyethylene.

In a general embodiment, the present disclosure provides a film made from or containing a layer made from or containing a peroxide-modified polyethylene.

In a general embodiment, the process for preparing a peroxide-modified polyethylene is extended to modification of polyethylene polymers prepared with catalysts other than Ziegler-Natta catalysts.

While multiple embodiments are disclosed, still other embodiments will become apparent to those skilled in the art from the following detailed description. As will be apparent, certain embodiments, as disclosed herein, are capable of modifications in various obvious aspects, all without departing from the spirit and scope of the claims as presented herein. Accordingly, the drawings and detailed description are to be regarded as illustrative in nature and not restrictive.

BRIEF DESCRIPTION OF THE SEVERAL VIEWS OF THE DRAWINGS

The following figures illustrate preferred embodiments of the subject matter disclosed herein. The claimed subject matter may be understood by reference to the following description taken in conjunction with the accompanying figures, in which like reference numerals identify like elements, and in which:

FIG. 5 shows a rheology plot for (a) a comparative superhexene, linear low density polyethylene, having a melt index of 0.6 g/10 min and a density of 0.9215 g/cc; (b) a comparative chromium-catalyzed linear low density polyethylene, having a melt index of 0.75 g/10 min and a density of 0.920 g/cc; (c) a peroxide-modified polyethylene prepared from a polyethylene composition made from or containing 20 weight percent of a first Ziegler-Natta-catalyzed polyethylene, having a melt index (ASTM D 1238) in the range of about 5.5 g/10 min to about 7.5 g/10 min, and 80 weight percent of a second Ziegler-Natta-catalyzed polyethylene, having a melt index in the range of about 0.5 g/10 min to about 3.0 g/10 min, based upon the total weight of the polyethylene composition; and (d) a peroxide-modified polyethylene prepared from a polyethylene composition made from or containing 10 weight percent of a first Ziegler-Natta-catalyzed polyethylene, having a melt index (ASTM D 1238) in the range of about 5.5 g/10 min to about 7.5 g/10 min, and 90 weight percent of a second Ziegler-Natta-catalyzed polyethylene, having a melt index in the range of about 0.5 g/10 min to about 3.0 g/10 min, based upon the total weight of the polyethylene composition.

DETAILED DESCRIPTION OF THE INVENTION

Figure 1:
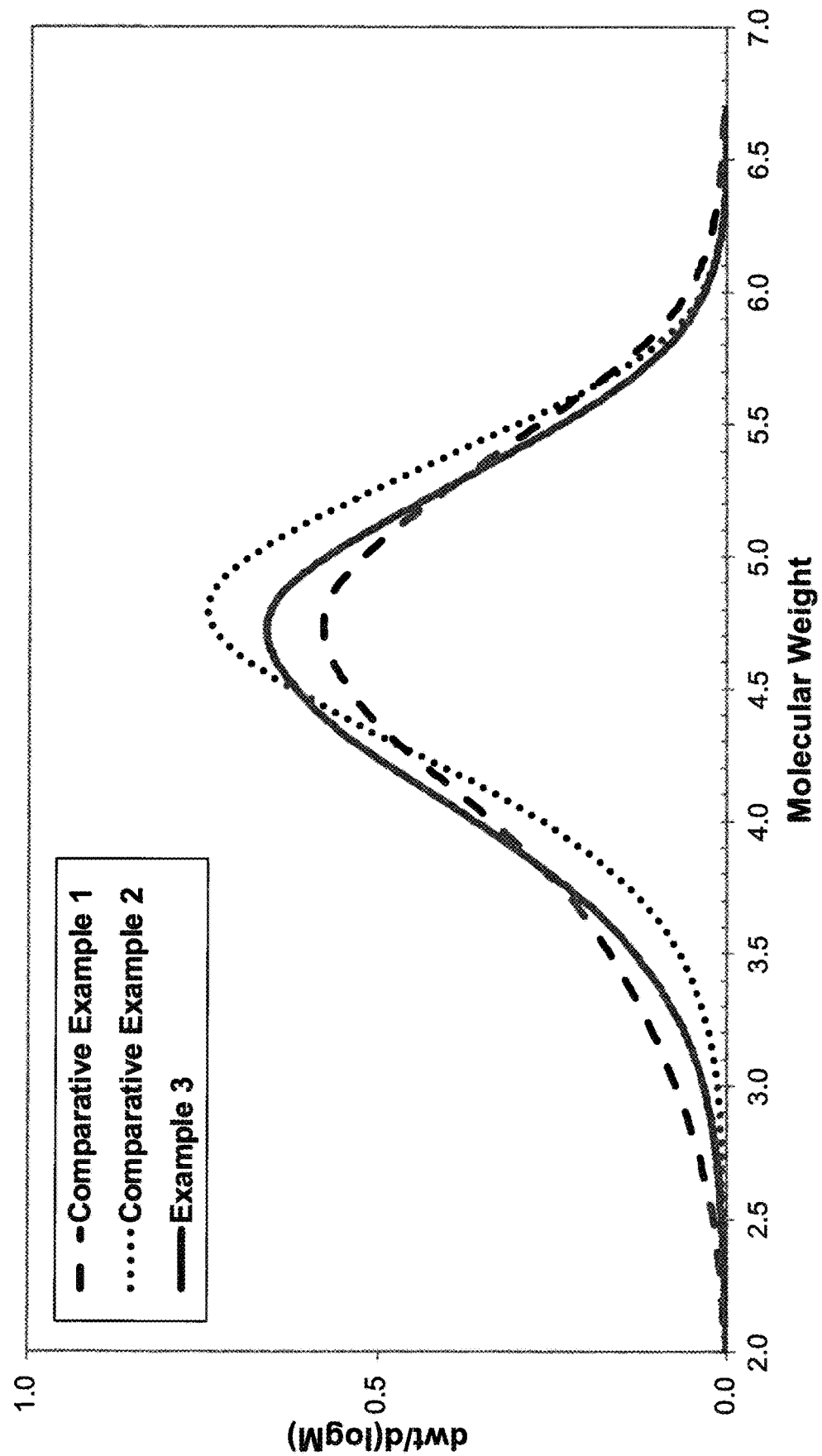
FIG. 1 shows gel permeation chromatographs for (a) a comparative chromium-catalyzed linear low density polyethylene, (b) a Ziegler-Natta catalyzed linear low density polyethylene, and (c) a peroxide-modified, Ziegler-Natta catalyzed linear low density polyethylene.

The present invention now will be described more fully hereinafter. However, this invention can be embodied in many different forms and should not be construed as limited to the embodiments set forth herein; rather, these embodiments are provided so that this disclosure will satisfy applicable legal requirements. As such, it will be apparent to those skilled in the art that the embodiments can incorporate changes and modifications without departing from the general scope. It is intended to include all the modifications and alterations in so far as the modifications and alterations come within the scope of the appended claims or the equivalents thereof.

As used in this specification and the claims, the singular forms "a," "an," and "the" include plural referents unless the context clearly dictates otherwise.

As used in this specification and the claims, the terms "comprising," "containing," or "including" mean that at least the named compound, element, material, particle, or method step, etc., is present in the composition, the article, or the method, but does not exclude the presence of other compounds, elements, materials, particles, or method steps, etc., even if the other such compounds, elements, materials, particles, or method steps, etc., have the same function as that which is named, unless expressly excluded in the claims. It is also to be understood that the mention of one or more method steps does not preclude the presence of additional method steps before or after the combined recited steps or intervening method steps between those steps expressly identified.

Moreover, it is also to be understood that the lettering of process steps or ingredients is a means for identifying discrete activities or ingredients and the recited lettering can be arranged in any sequence, unless expressly indicated.

For the purpose of the present description and of the claims which follow, except where otherwise indicated, numbers expressing amounts, quantities, percentages, and so forth, are to be understood as being modified by the term "about". Also, ranges include any combination of the maximum and minimum points disclosed and include any intermediate ranges therein, which may or may not be specifically enumerated herein.

Definitions

In the present description, the term "chromium catalyst" can refer to Cr UCAT-B.

In the present description, the term "chromium-catalyzed polymer" mean any polymer that is made in the presence of a chromium catalyst.

In the present description, the term "film" refers to structures having a thickness of less than about 10 mils. A "sheet" has a thickness of as least about 10 mils. Multilayer films or sheets have at least two layers. In some embodiments, at least one layer serves as a barrier layer.

In the present description, the term "first" refers to the order in which a particular species is presented and does not necessarily indicate that a "second" species will be presented. For example, "first polymer composition" refers to the first of at least one polymer composition. The term does not reflect priority, importance, or significance in any other way. Similar terms used that can be used herein include "second," "third," "fourth," etc.

In the present description, the term "high density polyethylene" refers to ethylene based polymers having a density of from about 0.94 g/cc to about 0.97 g/cc.

In the present description, the term "low density polyethylene" refers to ethylene based polymers having a density in a range of 0.88 g/cc to 0.925 g/cc. In the present description, the term "linear low density polyethylene" refers to substantially linear low density polyethylene characterized by the absence of long chain branching.

In the present description, the term "medium density polyethylene" refers to ethylene based polymers having a density of from 0.92 g/cc to 0.94 g/cc.

In the present description, the terms "monomer" and "comonomer" are used interchangeably. The terms mean any compound with a polymerizable moiety that is added to a reactor in order to produce a polymer. In those instances in which a polymer is described as comprising one or more monomers, e.g., a polymer comprising propylene and ethylene, the polymer, of course, comprises units derived from the monomers, e.g., $-CH_2-CH_2-$, and not the monomer itself, e.g., $CH_2=CH_2$.

In the present description, the term "polymer" means a macromolecular compound prepared by polymerizing monomers of the same or different type. The term "polymer" includes homopolymers, copolymers, terpolymers, interpolymers, and so on.

In the present description, the term "polymer composition" refers to a composition made from or containing at least one polymer.

In the present description, the term "Ziegler-Natta catalyst" can refer to (i) UCAT-A, (ii) UCAT-J, or (iii) a catalyst including MRx, wherein M is a transition metal, R is a halogen, an alkoxy, or a hydrocarboxyl group and x is the valence of the transition metal.

In the present description, the terms "Ziegler-Natta-catalyzed polymer" and "Z-N-catalyzed polymer" mean any polymer that is made in the presence of a Ziegler-Natta catalyst.

Testing

ASTM D 638 is entitled "Standard Test Method for Tensile Properties of Plastics." The term "ASTM D 638" as used herein refers to the test method designed to produce tensile property data for the control and specification of plastic materials. This test method covers the determination of the tensile properties of unreinforced and reinforced plastics in the form of standard dumbbell-shaped test specimens when tested under defined conditions of pretreatment, temperature, humidity, and testing machine speed. This test method can be used for testing materials of any thickness up to 14 mm (0.55 in.). This test method was approved in 2010, the contents of which are incorporated herein by reference in its entirety.

ASTM D 648 is entitled "Standard Test Method for Deflection Temperature of Plastics under Flexural Load in the Edgewise Position." The term "ASTM D 648" as used herein refers to the test method determination of the temperature at which an arbitrary deformation occurs when specimens are subjected to an arbitrary set of testing conditions. This test method applies to molded and sheet materials available in thicknesses of 3 mm [⅛ in.] or greater and which are rigid or semirigid at normal temperature. This test method was approved in 2007, the contents of which are incorporated herein by reference in its entirety.

ASTM D 792 is entitled "Test Methods for Density and Specific Gravity (Relative Density) of Plastics by Displacement." The term "ASTM D 792" as used herein refers to the standard test method for determining the specific gravity (relative density) and density of solid plastics in forms such as sheets, rods, tubes, or molded items. The test method includes determining the mass of a specimen of the solid plastic in air, determining the apparent mass of the specimen upon immersion in a liquid, and calculating the specimen's specific gravity (relative density). This test method was approved on Jun. 15, 2008 and published July 2008, the contents of which are incorporated herein by reference in its entirety.

ASTM D 1238 is entitled "Test Method for Melt Flow Rates of Thermoplastics by Extrusion Plastometer." The term "ASTM D 1238" as used herein refers to a test method covering the determination of the rate of extrusion of molten thermoplastic resins using an extrusion plastometer. After a specified preheating time, resin is extruded through a die with a specified length and orifice diameter under prescribed conditions of temperature, load, and piston position in the barrel. This test method was approved on Feb. 1, 2012 and published March 2012, the contents of which are incorporated herein by reference in its entirety.

Throughout the present description and claims, the standard melt index values of polyethylene polymers are measured according to ASTM D 1238, using a piston load of 2.16 kg and at a temperature of 190 degrees Celsius. The High Load Melt Index (or HLMI) values are also measured according to ASTM D 1238, but using a piston load of 21.6 kg and at a temperature of 190 degrees Celsius.

ASTM D 1505 is entitled "Standard Test Method for Density of Plastics by the Density-Gradient Technique." The term "ASTM D 1505" as used herein refers to a test method based on observing the level to which a test specimen sinks in a liquid column exhibiting a density gradient, in comparison with standards of known density. This test method was approved on Jul. 1, 2010 and published September 2010, the contents of which are incorporated herein by reference in its entirety.

For the referenced ASTM standards, visit the ASTM website, www.astm.org, or contact ASTM Customer Service at service@astm.org.

"Molecular Weight Distribution (Mw/Mn)" is measured by gel permeation chromatography. MWD and the ratio $M_w/M_n$ are determined using a Waters 150-C ALC/Gel Permeation Chromatography (GPC) system equipped with a TSK column set (type GMHXL-HT) working at 135 degrees Celsius with 1,2-dichlorobenzene as solvent (ODCB) (stabilized with 0.1 volume of 2,6-di-t-butyl p-cresole (BHT)) at flow rate of 1 ml/min. The sample is dissolved in ODCB by stirring continuously at a temperature of 140 degrees Celsius for 1 hour. The solution is filtered through a 0.45 μm Teflon membrane. The filtrate (concentration 0.08-1.2 g/l injection volume 300 μl) is subjected to GPC. Monodisperse fractions of polystyrene (provided by Polymer Laboratories) are used as standard.

In general embodiments, the present disclosure provides a process for preparing a peroxide-modified polyethylene including the steps of:

(A) preparing a first Ziegler-Natta-catalyzed polyethylene in a first reactor, having a molecular weight distribution;
(B) transferring the first Ziegler-Natta-catalyzed polyethylene from the first reactor to a second reactor;
(C) admixing a first amount of an organic peroxide to the second reactor;
(D) reacting the organic peroxide with a polyethylene composition made from or containing the first Ziegler-Natta-catalyzed polyethylene, thereby modifying the molecular weight distribution of the polyethylene components and forming the peroxide-modified polyethylene; and
(E) collecting the peroxide-modified catalyzed polyethylene.

In some embodiments, Ziegler-Natta catalyst systems are formed from the combination of a metal component with one or more additional components, such as a catalyst support, a co-catalyst and/or one or more electron donors. In some embodiments, the metal component is an active catalyst site.

In some embodiments, a Ziegler-Natta catalyst includes a metal component represented by the formula:

wherein M is a transition metal, R is a halogen, an alkoxy, or a hydrocarboxyl group and x is the valence of the transition metal. In some embodiments, x is from 1 to 4.

In some embodiments, the transition metal is selected from Groups IV through VIB. In some embodiments, the transition metal is selected from the group consisting of titanium, chromium, and vanadium.

In some embodiments, R is selected from the group consisting of chlorine, bromine, carbonate, ester, and an alkoxy group.

In some embodiments, the catalyst components include $TiCl_4$, $TiBr_4$, $Ti(OC_2H_5)_3Cl$, $Ti(OC_3H_7)_2Cl_2$, $Ti(OC_6H_{13})_2Cl_2$, $Ti(OC_2H_5)_2Br_2$ and $Ti(OC_{12}H_{25})Cl_3$.

In some embodiments, the catalyst is "activated". In some embodiments, activation is accomplished by contacting the catalyst with an activator, which is also referred to in some instances as a "co-catalyst". In some embodiments, Z-N activators include organoaluminum compounds, such as trimethyl aluminum (TMA), triethyl aluminum (TEAl) and triisobutyl aluminum (TiBAl).

In some embodiments, the Ziegler-Natta catalyst system includes one or more electron donors, such as internal electron donors and/or external electron donors. In some embodiments, internal electron donors are selected from the group consisting of amines, amides, esters, ketones, nitriles, ethers, thioethers, thioesters, aldehydes, alcoholates, salts, organic acids, phosphines, diethers, succinates, phthalates, malonates, maleic acid derivatives, dialkoxybenzenes, and combinations thereof.

In some embodiments, the internal donor includes a $C_3$-$C_6$ cyclic ether. In some embodiments, the internal donor includes a $C_3$-$C_5$ cyclic ether. In some embodiments, the cyclic ethers is selected from the group consisting of tetrahydrofurane, dioxane, methyltetrahydrofurane and combinations thereof. In some embodiments, internal donors are as disclosed in Patent Cooperation Treaty Publication No. WO2012/025379, which is incorporated by reference herein.

In some embodiments, the external electron donors are selected from the group consisting of monofunctional or polyfunctional carboxylic acids, carboxylic anhydrides, carboxylic esters, ketones, ethers, alcohols, lactones, organophosphorus compounds, and organosilicon compounds. In some embodiments, the external donor is selected from the group consisting of diphenyldimethoxysilane (DPMS), cyclohexylmethyldimethoxysilane (CMDS), diisopropyldimethoxysilane (DIDS), and dicyclopentyldimethoxysilane (CPDS). In some embodiments, the external donor is the same as or different from the internal electron donor used. In some embodiments, the catalyst system is free of an external donor.

In some embodiments, the components of the Ziegler-Natta catalyst system are associated with a support, either in combination with each other or separate from one another. In some embodiments, the components of the Ziegler-Natta catalyst system are not associated with a support. In some embodiments, the Z-N support materials includes a magnesium dihalide or silica. In some embodiments, the magnesium dihalide is magnesium dichloride or magnesium dibromide.

In some embodiments, the support includes a magnesium compound represented by the formula:

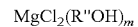

wherein R" is a $C_1$-$C_{10}$ alkyl and m is in a range of 0.5 to 3.

In some embodiments, the Ziegler-Natta catalyst system exhibits a molar ratio of support to metal component (measured as the amount of metal of each component) Mg:Ti of greater than about 5:1, alternatively in a range of about 7:1 to about 50:1, alternatively in a range of about 10:1 to about 25:1.

In some embodiments, the Ziegler-Natta catalyst system exhibits a molar ratio of support to internal donor Mg:ID of less than about 3:1, alternatively less than about 2.9:1, alternatively less than about 2.6:1, alternatively less than about 2.1:1, alternatively less than about 2:1, alternatively from about 1.1:1 to about 1.4:1.

In some embodiments, the Ziegler-Natta catalyst system exhibits an X-ray diffraction spectrum in which the range of 2Θ diffraction angles between 5.0° and 20.0°, at least three main diffraction peaks are present at diffraction angles 2Θ of about 7.2±0.2°, about 11.5±0.2°, and about 14.5±0.2°, the peak at 2Θ of about 7.2±0.2° being the most intense peak and the peak at about 11.5±0.2° having an intensity less than about 0.9 times the intensity of the most intense peak.

In some embodiments, the intensity of the peak at 11.5° has an intensity less than about 0.8 times the intensity of the diffraction peak at 2Θ diffraction angles of about 7.2±0.2°. In some embodiments, the intensity of the peak at about 14.5±0.2° is less than about 0.5 times, alternatively less than about 0.4 times the intensity of the diffraction peak at 2Θ diffraction angles of about 7.2±0.2°.

In some embodiments, another diffraction peak is present at diffraction angles 2Θ of about 8.2±0.2° having an intensity equal to or lower than the intensity of the diffraction peak at 2Θ diffraction angles of about 7.2±0.2°. In some embodiments, the intensity of the peak at diffraction angles 2Θ of about 8.2±0.2° is less than about 0.9, alternatively less than about 0.5 times the intensity of the diffraction peak at 2Θ diffraction angles of about 7.2±0.2°.

In some embodiments, an additional broad peak is observed at diffraction angles 2Θ of about 18.2±0.2° having an intensity less than about 0.5 times the intensity of the diffraction peak at 2Θ diffraction angles of about 7.2±0.2°. As referenced herein, the X-ray diffraction spectra are collected by using Bruker D8 advance powder diffractometer or a comparable apparatus.

The Ziegler-Natta catalyst may be formed by many methods. In some embodiments, the Ziegler-Natta catalyst is formed by contacting a transition metal halide with a metal alkyl or metal hydride. In some embodiments, the Ziegler-Natta catalyst is prepared as described in at least one of U.S. Pat. Nos. 4,298,718; 4,298,718; 4,544,717; 4,767,735; and 4,544,717, which are incorporated by reference herein.

In some embodiments, the first Ziegler-Natta-catalyzed polyethylene is a linear low density polyethylene, a medium density polyethylene, or a high density polyethylene.

In some embodiments, the first Ziegler-Natta-catalyzed polyethylene is a linear low density polyethylene, having a melt index (ASTM D 1238) in the range of about 5.5 g/10 min to about 7.5 g/10 min, a density (ASTM D 1505) in the range of about 0.88 g/cc to about 0.925 g/cc, a tensile strength (ASTM D 638) in the range of about 1400 psi to about 2,000 psi, and an elongation at break (ASTM D 638) in the range of about 750% to about 1000%. In some embodiments, the melt index of the linear low density polyethylene is 5.5, 5.6, 5.7, 5.8, 5.9, 6.0, 6.1, 6.2, 6.3, 6.4, 6.5, 6.6, 6.7, 6.8, 6.9, 7.0, 7.1, 7.2, 7.3, 7.4, 7.5 g/10 min, or an intermediate melt index. In some embodiments, the density is 0.88, 0.89, 0.90, 0.91, 0.92, 0.925 g/cc, or an intermediate density. In some embodiments, the tensile strength is 1400, 1450, 1500, 1550, 1600, 1650, 1700, 1750, 1800, 1850, 1900, 1950, 2,000 psi, or an intermediate tensile strength. In some embodiments, the elongation at break is 750, 800, 850, 900, 950, 1000%, or an intermediate elongation at break.

In some embodiments, the first Ziegler-Natta-catalyzed polyethylene has a first molecular weight distribution, the peroxide-modified polyethylene has a second molecular weight distribution, and the first molecular weight distribution and the second molecular weight distribution are dissimilar.

In some embodiments, the organic peroxide is added in a first amount less than about 2000 ppm. In other embodiments, the organic peroxide is added in a first amount less than about 1500 ppm. In yet other embodiments, the organic peroxide is added in an amount in the range of about 100 ppm to about 700 ppm. In further embodiments, the organic peroxide is added in a first amount of about 100, 200, 300, 400, 500, 600, 700 ppm, or an intermediate amount.

In some embodiments, the present disclosure provides a process for preparing a peroxide-modified polyethylene including the steps of:
(A) preparing a first Ziegler-Natta-catalyzed polyethylene in a first reactor;
(B) preparing a high density polyethylene in a second reactor;
(C) transferring the first Ziegler-Natta-catalyzed polyethylene from the first reactor to a third reactor;
(D) transferring the high density polyethylene from the second reactor to the third reactor;
(E) admixing a first amount of an organic peroxide to the third reactor;
(F) reacting the organic peroxide with a polyethylene composition made from or containing the first Ziegler-Natta-catalyzed polyethylene and the high density polyethylene, thereby coupling the polyethylene components and forming the peroxide-modified polyethylene; and
(G) collecting the peroxide-modified polyethylene.

Alternatively and for consistency with the general embodiment, this embodiment can be described as the general embodiment further including the steps of:

(A2) preparing a high density polyethylene in a third reactor;
(B2) transferring the high density polyethylene from the third reactor to the second reactor,
wherein the polyethylene composition is made from or further contains the high density polyethylene.

In some embodiments, the high density polyethylene has a melt index (ASTM D 1238) in the range of about 0.1 g/10 min to about 1.5 g/10 min, a density (ASTM D 1505) in the range of about 0.94 g/cc to about 0.97 g/cc, a tensile strength (ASTM D 638) in the range of about 2,500 psi to about 3,500 psi, and an elongation at break (ASTM D 638) in the range of about 600% to about 1000%. In some embodiments, the melt index is about 0.5 g/10 min to about 1.0 g/10 min, alternatively 0.5, 0.6, 0.7, 0.8, 0.9, 1.0 g/10 min, or an intermediate melt index. In some embodiments, the density is 0.940, 0.945, 0.950, 0.955, 0.960, 0.965, 0.970 g/cc, or an intermediate density. In some embodiments, the tensile strength is in the range of about 3,000 psi to about 3,500 psi, alternatively, 3,000, 3,100, 3,200, 3,300, 3,400, 3,500 psi, or an intermediate tensile strength. In some embodiments, the elongation at break is 600, 650, 700, 750, 800, 850, 900, 950, 1000%, or an intermediate elongation at break.

In some embodiments, the first Ziegler-Natta-catalyzed polyethylene has a first molecular weight distribution, the high density polyethylene has a second molecular weight distribution, the peroxide-modified polyethylene has a third molecular weight distribution, and the third molecular weight distribution differs from either the first molecular weight distribution or the second molecular weight distribution.

In some embodiments, the first Ziegler-Natta-catalyzed polyethylene is added to the third reactor in an amount from about 60 weight percent to about 95 weight percent, based upon the total weight of the polyethylene composition, and the high density polyethylene is added in an amount from about 5 weight percent to about 40 weight percent, based upon the total weight of the polyethylene composition. In some embodiments, the first Ziegler-Natta-catalyzed polyethylene is added in amount from about 75 weight percent to about 90 weight percent, alternatively 75, 76, 77, 78, 79, 80, 81, 82, 83, 84, 85, 86, 87, 88, 89, 90 wt %, or an intermediate weight percent. In some embodiments, the high density polyethylene is added in an amount from about 15 weight percent to about 25 weight percent, alternatively 10, 11, 12, 13, 14, 15, 16, 17, 18, 19, 20, 21, 22, 23, 24, 25 wt %, or an intermediate weight percent.

In some embodiments, the present disclosure provides a process for preparing a peroxide-modified polyethylene including the steps of:
(A) preparing a first Ziegler-Natta-catalyzed polyethylene in a first reactor, having a melt index (ASTM D 1238) in the range of about 5.5 g/10 min to about 7.5 g/10 min and;
(B) preparing a second Ziegler-Natta-catalyzed polyethylene in a second reactor, having a melt index in the range of about 0.5 g/10 min to about 3.0 g/10 min;
(C) transferring the first Ziegler-Natta-catalyzed polyethylene from the first reactor to a third reactor;
(D) transferring the second Ziegler-Natta-catalyzed polyethylene from the second reactor to the third reactor;
(E) admixing a first amount of an organic peroxide to the third reactor;
(F) reacting the organic peroxide with a polyethylene composition made from or containing the first Ziegler-Natta-catalyzed polyethylene and the second Ziegler-Natta-catalyzed polyethylene, thereby coupling the polyethylene components and forming a peroxide-modified polyethylene; and (E) collecting the peroxide-modified polyethylene.

Alternatively and for consistency with the general embodiment, this embodiment can be described as the general embodiment further including the steps of:

(A2) preparing a second Ziegler-Natta-catalyzed polyethylene in a third reactor;

(B2) transferring the second Ziegler-Natta-catalyzed polyethylene from the third reactor to the second reactor, wherein (i) the first Ziegler-Natta-catalyzed polyethylene has a melt index (ASTM D 1238) in the range of about 5.5 g/10 min to about 7.5 g/10 min;

(ii) the second Ziegler-Natta-catalyzed polyethylene has a melt index in the range of about 0.5 g/10 min to about 3.0 g/10 min; and (iii) the polyethylene composition is made from or further contains the second Ziegler-Natta-catalyzed polyethylene.

In some embodiments, the first Ziegler-Natta-catalyzed polyethylene is a linear low density polyethylene, having a density (ASTM D 1505) in the range of about 0.88 g/cc to about 0.925 g/cc, a tensile strength (ASTM D 638) in the range of about 1400 psi to about 2,000 psi, and an elongation at break (ASTM D 638) in the range of about 750% to about 1000%. In some embodiments, the melt index of the linear low density polyethylene is 5.5, 5.6, 5.7, 5.8, 5.9, 6.0, 6.1, 6.2, 6.3, 6.4, 6.5, 6.6, 6.7, 6.8, 6.9, 7.0, 7.1, 7.2, 7.3, 7.4, 7.5 g/10 min, or an intermediate melt index. In some embodiments, the density is 0.88, 0.89, 0.90, 0.91, 0.92, 0.925 g/cc, or an intermediate density. In some embodiments, the tensile strength is 1400, 1450, 1500, 1550, 1600, 1650, 1700, 1750, 1800, 1850, 1900, 1950, 2,000 psi, or an intermediate tensile strength. In some embodiments, the elongation at break is 750, 800, 850, 900, 950, 1000%, or an intermediate elongation at break.

In some embodiments, the second Ziegler-Natta-catalyzed polyethylene is a linear low density polyethylene, having a melt index (ASTM D 1238) in the range of about 1.5 g/10 min to about 2.5 g/10 min and a density (ASTM D 1505) in the range of about 0.88 g/cc to about 0.925 g/cc. In some embodiments, the melt index of the linear low density polyethylene is 1.5, 1.6, 1.7, 1.8, 1.9, 2.0, 2.1, 2.2, 2.3, 2.4, or 2.5 g/10 min, or an intermediate melt index. In some embodiments, the density is 0.88, 0.89, 0.90, 0.91, 0.92, 0.925 g/cc, or an intermediate density.

In some embodiments, the first Ziegler-Natta-catalyzed polyethylene has a first molecular weight distribution, the second Ziegler-Natta-catalyzed polyethylene has a second molecular weight distribution, the peroxide-modified polyethylene has a third molecular weight distribution, and the third molecular weight distribution differs from either the first molecular weight distribution or the second molecular weight distribution. In some embodiments, the peroxide-modified polyethylene has a molecular weight distribution of at least two modes.

In some embodiments, the first Ziegler-Natta-catalyzed polyethylene is added to the third reactor in an amount from about 5 weight percent to about 30 weight percent, based upon the total weight of the polyethylene composition, and the second Ziegler-Natta-catalyzed polyethylene is added in an amount from about 70 weight percent to about 95 weight percent, based upon the total weight of the polyethylene composition. In some embodiments, the first Ziegler-Natta-catalyzed polyethylene is added in amount from about 10 weight percent to about 20 weight percent, alternatively 10, 11, 12, 13, 14, 15, 16, 17, 18, 19, 20 wt %, or an intermediate weight percent. In some embodiments, the second Ziegler-Natta-catalyzed polyethylene is added in an amount from about 80 weight percent to about 90 weight percent, alternatively 80, 81, 82, 83, 84, 85, 86, 87, 88, 89, 90 wt %, or an intermediate weight percent.

In some embodiments, the present disclosure provides a process for preparing a peroxide-modified polyethylene including the steps of:

(A) preparing a first Ziegler-Natta-catalyzed polyethylene in a first reactor, having a melt index (ASTM D 1238) in the range of about 0.5 g/10 min to about 160 g/10 min;

(B) preparing a second Ziegler-Natta-catalyzed polyethylene in a second reactor, having a melt index in the range of about 0.5 g/10 min to about 7.0 g/10 min;

(C) transferring the first Ziegler-Natta-catalyzed polyethylene from the first reactor to a third reactor;

(D) transferring the second Ziegler-Natta-catalyzed polyethylene from the second reactor to the third reactor;

(E) admixing a first amount of an organic peroxide to the third reactor;

(F) reacting the organic peroxide with a polyethylene composition made from or containing the first Ziegler-Natta-catalyzed polyethylene and the second Ziegler-Natta-catalyzed polyethylene, thereby coupling the polyethylene components and forming a peroxide-modified polyethylene; and (E) collecting the peroxide-modified polyethylene.

Alternatively and for consistency with the general embodiment, this embodiment can be described as the general embodiment further including the steps of:

(A2) preparing a second Ziegler-Natta-catalyzed polyethylene in a third reactor;

(B2) transferring the second Ziegler-Natta-catalyzed polyethylene from the third reactor to the second reactor, wherein (i) the first Ziegler-Natta-catalyzed polyethylene has a melt index (ASTM D 1238) in the range of about 0.5 g/10 min to about 160 g/10 min;

(ii) the second Ziegler-Natta-catalyzed polyethylene has a melt index in the range of about 0.5 g/10 min to about 7.0 g/10 min; and (iii) the polyethylene composition is made from or further contains the second Ziegler-Natta-catalyzed polyethylene.

In a general embodiment, the present disclosure provides a peroxide-modified polyethylene composition made from or containing a peroxide-modified polyethylene. In some embodiments, the peroxide-modified polyethylene has a viscosity at 100 rad/s at 190° C. less than about 23,400 poise, alternatively less than about 22,000 poise, alternatively less than about 21,000 poise.

In some embodiments, the peroxide-modified polyethylene composition is further made from or containing an additives composition. In some embodiments, the additives are selected from the group consisting of colorants, odorants, deodorants, plasticizers, impact modifiers, fillers, nucleating agents, lubricants, surfactants, wetting agents, flame retardants, ultraviolet light stabilizers, antioxidants, biocides, metal deactivating agents, thickening agents, heat stabilizers, defoaming agents, other coupling agents, polymer alloy compatibilizing agent, blowing agents, emulsifiers, crosslinking agents, waxes, particulates, flow promoters, and other materials added to enhance processability or end-use properties of the polymeric components.

In a general embodiment, the present disclosure provides a film composition made from or containing a peroxide-modified polyethylene composition.

In a general embodiment, the present disclosure provides a film made from or containing a layer made from or containing a film composition. In some embodiments, the film is a multi-layer film having more than one layer.

In some embodiments, the film, based upon an 8.0 mil thickness, has a dart drop greater than about 550 g, alternatively greater than about 750 g, alternatively greater than about 1000 g. In some embodiments, the film, based upon an 8.0 mil thickness, has MD Modulus greater than about 29,000 psi, alternatively greater than about 30,000 psi, alternatively greater than about 32,500 psi, alternatively greater than about 33,500 psi. In some embodiments, the film, based upon an 8.0 mil thickness, has TD Modulus greater than about 29,000 psi, alternatively greater than about 30,000 psi, alternatively greater than about 32,500 psi, alternatively greater than about 33,500 psi. In some embodiments, the film, based upon an 8.0 mil thickness, has MD tear greater than about 1,000 g, alternatively greater than about 2,000 g, alternatively greater than about 2,500 g. In some embodiments, the film, based upon an 8.0 mil thickness, has TD tear greater than about 2,000 g, alternatively greater than about 3,000 g, alternatively greater than about 3,500 g.

In a general embodiment, the present disclosure provides a sheet composition made from or containing a peroxide-modified polyethylene composition.

In a general embodiment, the present disclosure provides a sheet made from or containing a layer made from or containing a sheet composition. In some embodiments, the sheet is a multi-layer sheet having more than one layer.

EXAMPLES

The following examples are included to demonstrate embodiments. It should be appreciated by those of skill in the art that the techniques disclosed in the examples which follow represent techniques discovered to function well, and thus can be considered to constitute exemplary modes of practice. However, those of skill in the art should, in light of the present disclosure, appreciate that many changes can be made in the specific embodiments which are disclosed and still obtain a like or similar result without departing from the spirit and scope of this disclosure.

FIG. 1 shows that following peroxide modification, the Ziegler-Natta catalyzed linear low density polyethylene achieved a molecular weight distribution more similar to the chromium-catalyzed linear low density polyethylene.

Comparative Example 1 is a chromium-catalyzed linear low density polyethylene, having a melt index of 0.75 g/10 min and a density of 0.920 g/cc. Comparative Example 2 is a Ziegler-Natta catalyzed linear low density polyethylene, having a melt index of 2.0 g/10 min and a density of 0.918 g/cc. Example 3 is a peroxide-modified Ziegler-Natta catalyzed linear low density polyethylene, having a melt index of 0.96 g/10 min.

Figure 2:
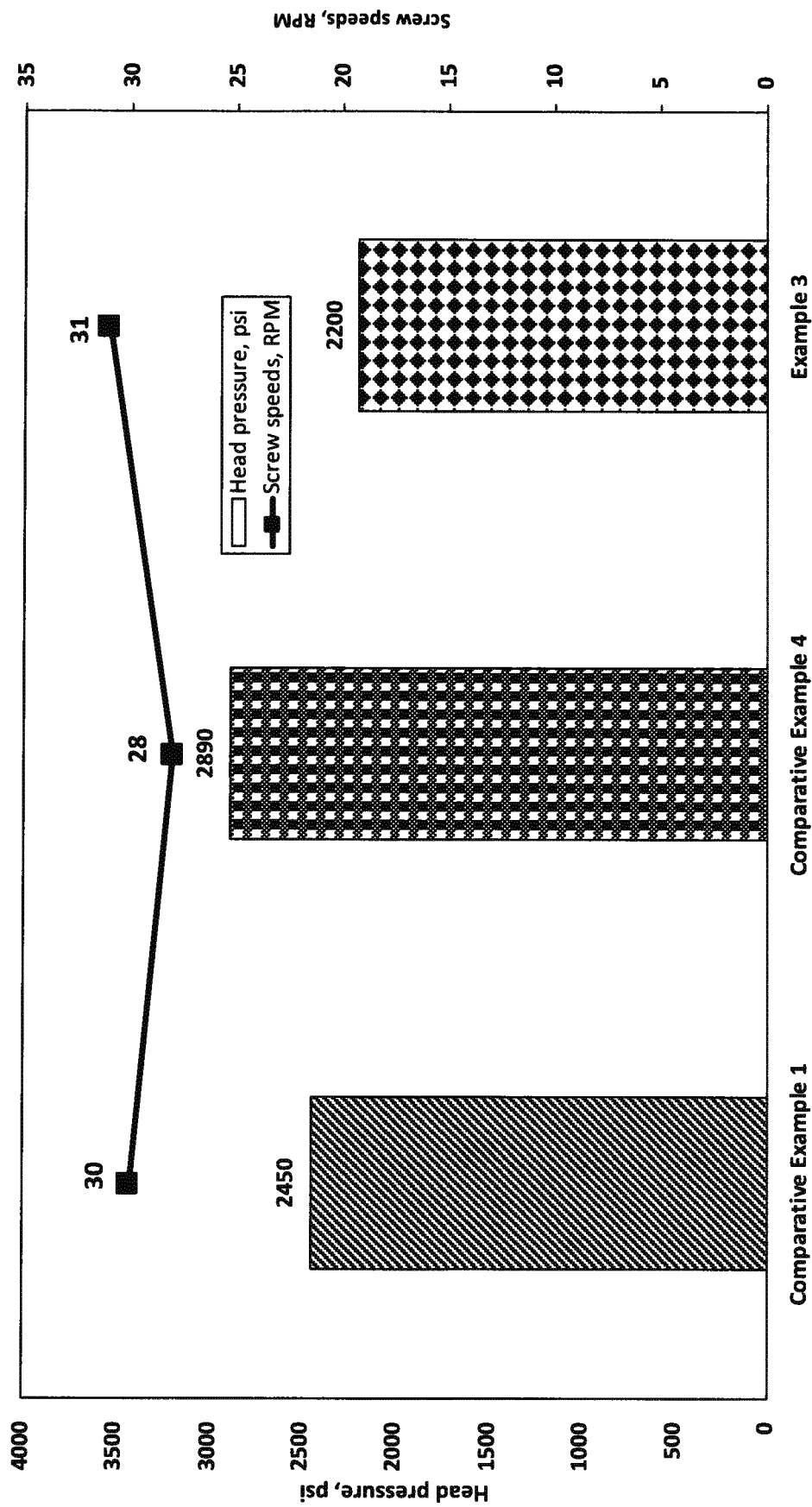
FIG. 2 show graphs of head pressure measured in pounds per square inch (PSI) and screw speed measured in revolutions per minute (RPM) for (a) a comparative chromium-catalyzed linear low density polyethylene, (b) a polyethylene composition made from or containing 80 weight percent of a Ziegler-Natta catalyzed linear low density polyethylene and 20 weight percent of a comparative chromium-catalyzed linear low density polyethylene, based upon the total weight of the polyethylene composition, and (c) a peroxide-modified, Ziegler-Natta catalyzed linear low density polyethylene.

FIG. 2 shows that following peroxide modification, the Ziegler-Natta catalyzed linear low density polyethylene achieved a screw speed comparable to the chromium-catalyzed polyethylene while demonstrating a lower head pressure.

Comparative Example 4 is a polyethylene blend made from or containing about 80 weight percent of a Ziegler-Natta catalyzed linear low density polyethylene, having a melt index of 2.0 g/10 min and a density of 0.917 g/cc, and about 20 weight percent of a chromium-catalyzed linear low density polyethylene having a melt index of 0.75 g/10 min and a density of 0.920 g/cc, both weight percents based upon the total weight of the polyethylene blend.

Figure 3:
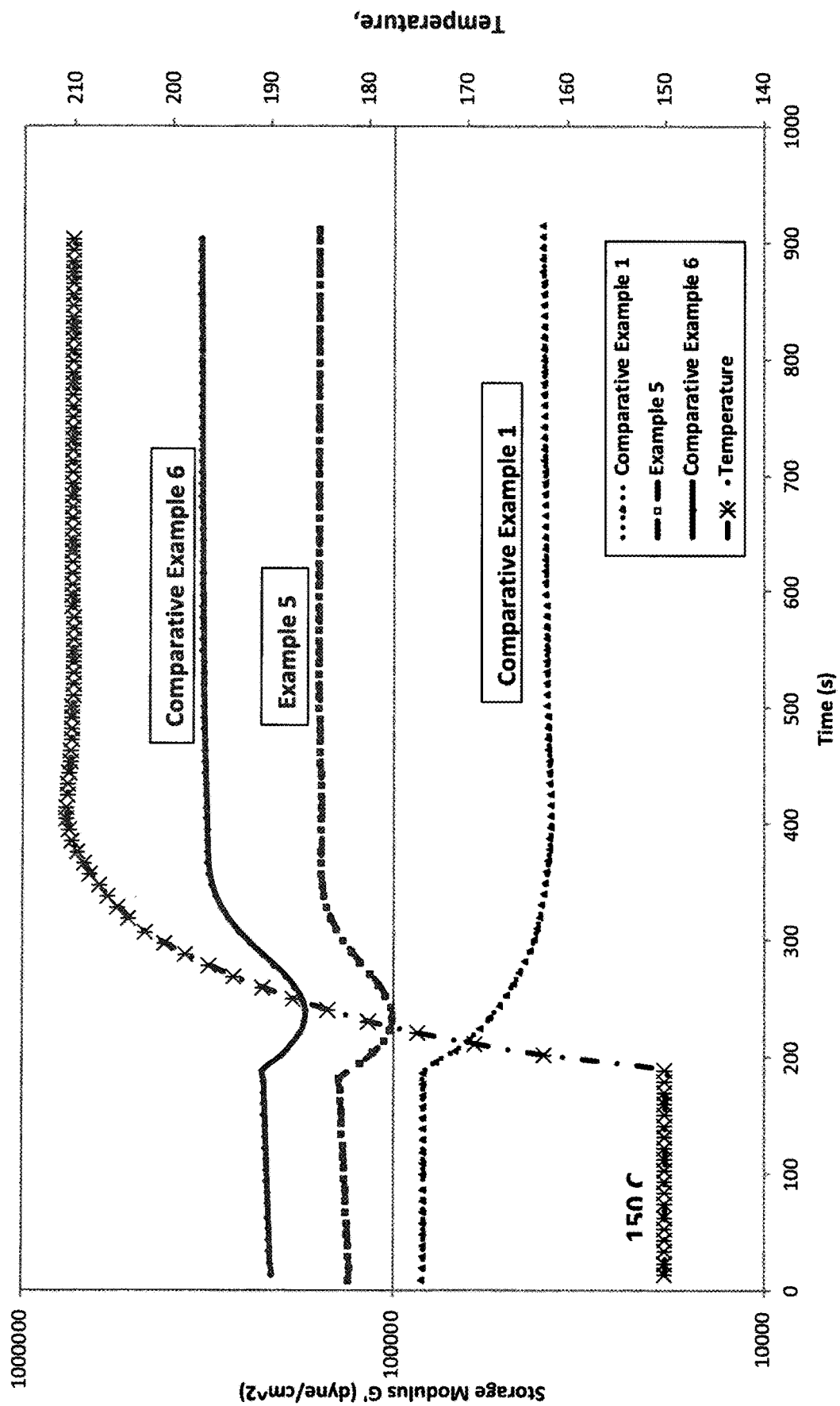
FIG. 3 shows a peroxide curing profile for (a) a comparative chromium-catalyzed linear low density polyethylene without peroxide, (b) a comparative chromium-catalyzed linear low density polyethylene with 1000 ppm peroxide, and (c) a peroxide-modified, Ziegler-Natta catalyzed linear low density polyethylene with 1000 ppm peroxide.

FIG. 3 shows that the peroxide-modified Ziegler-Natta catalyzed linear low density polyethylene achieves a cure profile at a lower viscosity over the entire temperature range similar to that a comparable chromium-catalyzed polyethylene.

Example 5 is the peroxide-modified Ziegler-Natta catalyzed linear low density polyethylene with an additional 1000 ppm of an organic peroxide. Comparative Example 6 is a chromium-catalyzed linear low density polyethylene with 1000 ppm of an organic peroxide.

Figure 4:
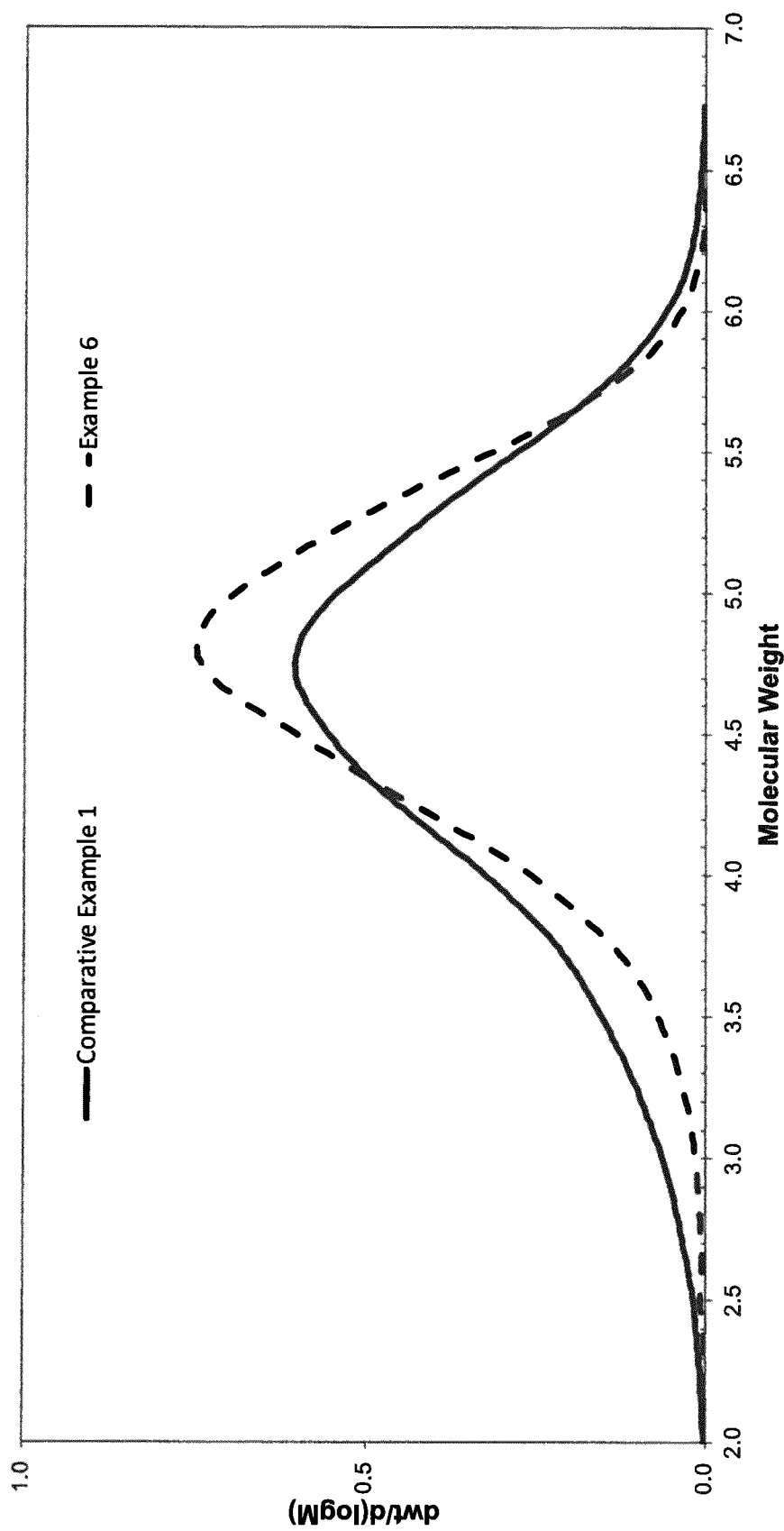
FIG. 4 shows gel permeation chromatographs for (a) a comparative chromium-catalyzed linear low density polyethylene and (b) a peroxide-modified polyethylene prepared from a polyethylene composition made from or containing 20 weight percent of a first Ziegler-Natta-catalyzed polyethylene, having a melt index (ASTM D 1238) in the range of about 5.5 g/10 min to about 7.5 g/10 min, and 80 weight percent of a second Ziegler-Natta-catalyzed polyethylene, having a melt index in the range of about 0.5 g/10 min to about 3.0 g/10 min, based upon the total weight of the polyethylene composition.

FIG. 4 shows that following peroxide modification, a polyethylene composition made from or containing 20 weight percent of a first Ziegler-Natta-catalyzed polyethylene, having a melt index (ASTM D 1238) in the range of about 5.5 g/10 min to about 7.5 g/10 min, and 80 weight percent of a second Ziegler-Natta-catalyzed polyethylene, having a melt index in the range of about 0.5 g/10 min to about 3.0 g/10 min, based upon the total weight of the polyethylene composition achieved a molecular weight distribution similar to the chromium-catalyzed linear low density polyethylene.

Example 6 is the peroxide-modified polyethylene.

FIG. 5 shows that a peroxide-modified polyethylene prepared from a polyethylene composition made from or containing 20 weight percent of a first Ziegler-Natta-catalyzed polyethylene, having a melt index (ASTM D 1238) in the range of about 5.5 g/10 min to about 7.5 g/10 min, and 80 weight percent of a second Ziegler-Natta-catalyzed polyethylene, having a melt index in the range of about 0.5 g/10 min to about 3.0 g/10 min, based upon the total weight of the polyethylene composition, similar rheological properties as a chromium-catalyzed linear low density polyethylene, having a melt index of 0.75 g/10 min and a density of 0.920 g/cc. The figure also shows a peroxide-modified polyethylene prepared from a polyethylene composition made from or containing 10 weight percent of a first Ziegler-Natta-catalyzed polyethylene, having a melt index (ASTM D 1238) in the range of about 5.5 g/10 min to about 7.5 g/10 min, and 90 weight percent of a second Ziegler-Natta-catalyzed polyethylene, having a melt index in the range of about 0.5 g/10 min to about 3.0 g/10 min, based upon the total weight of the polyethylene composition, similar rheological properties as a chromium-catalyzed linear low density polyethylene, having a melt index of 0.75 g/10 min and a density of 0.920 g/cc. The exemplified embodiments show lower viscosity at high shear rates and higher viscosity at low shear rates than a superhexene, linear low density polyethylene, having a melt index of 0.6 g/10 min and a density of 0.9215 g/cc.

For Examples 7 and 8 and Comparative Examples 9 and 10, various compounds were formulated to prepare the test specimen. The materials were admixed in the weight percents shown in TABLE 1.

The first Ziegler-Natta-catalyzed, linear low density polyethylene had a melt index of 6.5 g/10 min and a density of 0.918 g/cc.

The second Ziegler-Natta-catalyzed, linear low density polyethylene had a melt index of 2.0 g/10 min and a density of 0.917 g/cc.

A comparative linear low density polyethylene (LLDPE-1) is a superhexene, linear low density polyethylene, having a melt index of 0.6 g/10 min and a density of 0.9215 g/cc.

A comparative linear low density polyethlene (LLDPE-2) is a chromium-catalyzed linear low density polyethylene, having a melt index of 0.75 g/10 min and a density of 0.920 g/cc.

An organic peroxide is diisopropylbenzene dihydroperoxide (DBDH).

TABLE 1

| Components | Example 7 | Example 8 | Comp. Ex. 9 | Comp. Ex. 10 |
|---|---|---|---|---|
| First Z-N polymer | 10.0 | 20.0 | | |
| Second Z-N polymer | 89.6 | 79.6 | | |
| LLDPE-1 | | | 99.6 | |
| LLDPE-2 | | | | 99.6 |
| Polymer processing aid | 0.2 | 0.2 | 0.2 | 0.2 |
| DBDH | 0.2 | 0.2 | 0.2 | 0.2 |
| Physical Properties of an 8.0 mil thick film | | | | |
| Dart Drop, g | 1,030 | 1,010 | 1,950 | 520 |
| MD Mod, psi | 34,000 | 34,200 | 28,800 | 32,400 |
| TD Mod, psi | 33,800 | 35,300 | 28,800 | 33,400 |
| MD Tear, g | 2,849 | 2,951 | 4,805 | 965 |
| TD Tear, g | 3,875 | 3,843 | 4,575 | 1,814 |

It should be understood that various changes, substitutions and alterations can be made herein without departing from the spirit and scope of this disclosure as defined by the appended claims. Moreover, the scope of the present application is not intended to be limited to the particular embodiments of the process, machine, manufacture, composition of matter, means, methods and steps described in the specification. As one of the ordinary skill in the art will readily appreciate from the disclosure, processes, machines, manufacture, compositions of matter, means, methods, or steps, presently existing or later to be developed that perform substantially the same function or achieve substantially the same result as the corresponding embodiments described herein can be utilized. Accordingly, the appended claims are intended to include within their scope such processes, machines, manufacture, compositions of matter, means, methods, or steps.

What is claimed is:

1. A film composition comprising:
    (a) a peroxide-modified polyethylene composition comprising the reaction products of:
        (I) about 5 to about 30 wt. %, based on the total weight of the polyethylene composition, of a first linear low density polyethylene, wherein the first linear low density polyethylene has:
            a melt index of 5.5 to 7.5 g/10 min., measured with a load of 2.16 kg at
            a temperature of 190° C.,
            a density of 0.88 to 0.925 g/cm$^3$, and
            a tensile strength of 1,400 to 2,000 psi;
        (II) about 70 to about 95 wt. %, based on the total weight of the polyethylene composition, of a second linear low density polyethylene, wherein the second linear low density polyethylene has:
            a melt index of 0.5 to 3.0 g/10 min., measured with a load of 2.16 kg at
            a temperature of 190° C., and
            a density of 0.88 to 0.925 g/cm$^3$; and
        (III) 200 to 2000 ppm an organic peroxide.

2. The film composition of claim 1, wherein the peroxide-modified polyethylene composition further comprises a high density polyethylene, wherein the high density polyethylene has a density of 0.94 to 0.97 g/cm$^3$.

3. The film composition of claim 1, wherein
    the first linear low density polyethylene has a melt index from 6.0 g/10 min to 7.0 g/10 min; and
    (iv) the second linear low density polyethylene has a melt index from 1.0 to 2.5 g/10 min.

4. The film composition of claim 2, wherein the high density polyethylene has a melt index of 0.1 to 1.5 g/10 min., measured with a load of 2.16 kg at a temperature of 190° C., a density of 0.94 to 0.97 g/cm$^3$, and a tensile strength of 2,500 to 3,500 psi.

5. A film comprising:
    (1) a layer comprising a peroxide-modified polyethylene composition comprising the reaction products of:
        (I) about 5 to about 30 wt. %, based on the total weight of the polyethylene composition, of a first linear low density polyethylene, wherein the first linear low density polyethylene has:
            a melt index of 5.5 to 7.5 g/10 min., measured with a load of 2.16 kg at
            a temperature of 190° C.,
            a density of 0.88 to 0.925 g/cm$^3$, and
            a tensile strength of 1,400 to 2,000 psi;
        (II) about 70 to about 95 wt. %, based on the total weight of the polyethylene composition, of a second linear low density polyethylene, wherein the second linear low density polyethylene has:
            a melt index of 0.5 to 3.0 g/10 min., measured with a load of 2.16 kg at
            a temperature of 190° C., and
            a density of 0.88 to 0.925 g/cm$^3$; and
        (III) 200 to 2000 ppm an organic peroxide.

6. The film of claim 5, wherein, based upon an 8.0 mil thickness, the film has a dart drop greater than about 550 g, a MD Modulus greater than about 29,000 psi, a TD Modulus greater than about 29,000 psi, a MD tear greater than about 1,000 g, and a TD tear greater than about 2,000 g.

7. The film of claim 5, wherein the peroxide-modified polyethylene composition has a viscosity at 100 rad/s at 190° C. less than about 23,400 poise.

* * * * *